Oct. 17, 1961
H. P. GREGOR ET AL
3,004,904
ELECTRONEGATIVE-SELECTIVE PERMEABLE MEMBRANE
AND METHOD OF PRODUCTION
Filed May 25, 1955
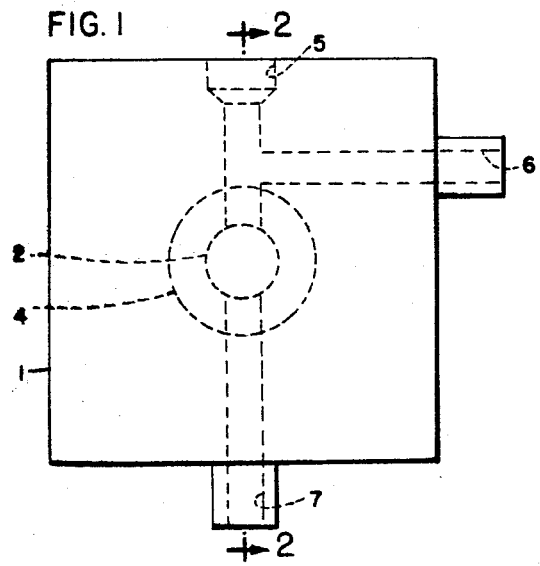
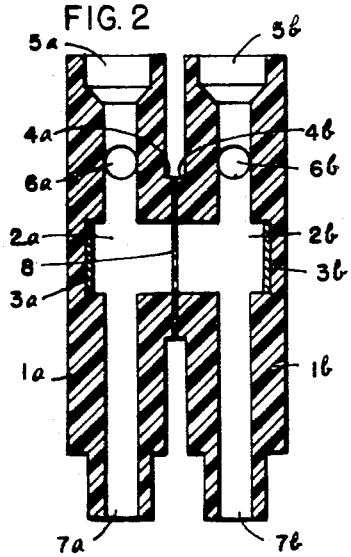
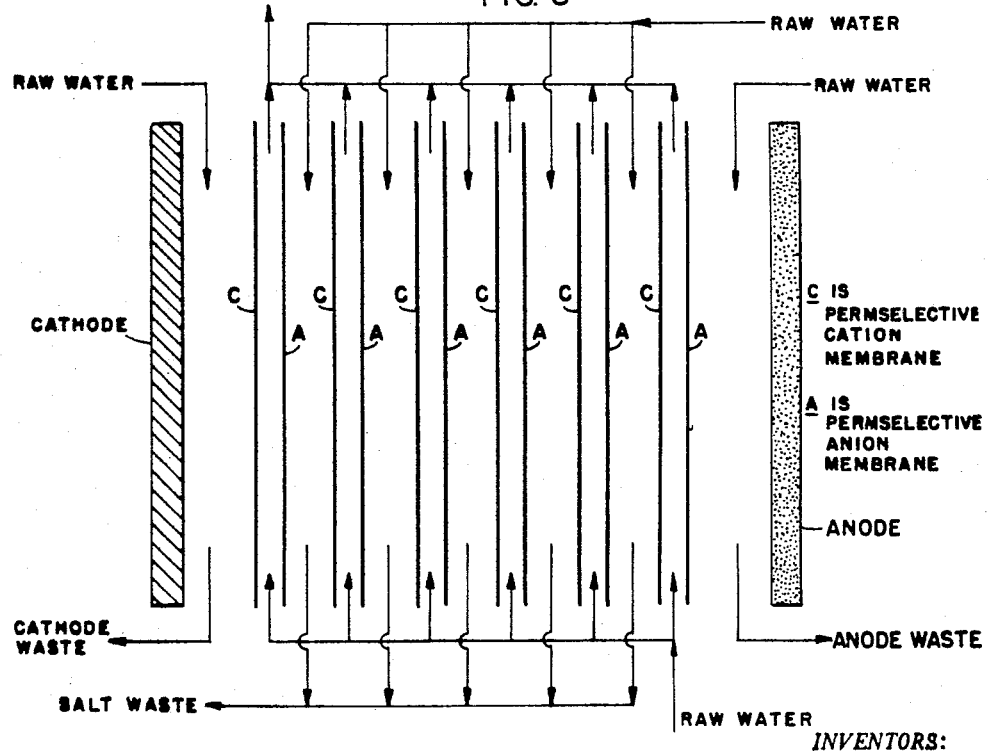
INVENTORS:
HARRY P. GREGOR
HAROLD I. PATZELT
BY Margare, Johnston, Cook & Root
ATT'YS

3,004,904
ELECTRONEGATIVE SELECTIVE PERMEABLE MEMBRANE AND METHOD OF PRODUCTION
Harry P. Gregor, Hewlett, N.Y., and Harold I. Patzelt, Chicago, Ill., assignors to Nalco Chemical Company, Chicago, Ill., a corporation of Delaware
Filed May 25, 1955, Ser. No. 511,062
16 Claims. (Cl. 204—180)

This invention relates to ion exchange membranes and the method of producing the same. More particularly, it relates to electronegative ion selective barriers having high permselectivities and low ohmic resistances.

Ion exchange membranes have been known for numerous years and their applications have been limited in the most part to laboratory investigations. In the past few years they have become the subject of considerable discussion, and their use in various fields has led to intensive investigations of these materials.

The electrical behavior of ion exchange membranes is usually explained on the basis of a fixed-charge theory which is also generally accepted as the operative principal of ion exchange resins. This theory may be briefly described as follows:

The walls of the pores of the membranes carry a definite number of potentially dissociable groups: acidic groups, such as carboxylic groups, in the case of the electronegative membranes, and basic groups, such as amino groups, in the case of the electropositive membranes. These dissociable groups are an integral part of the membrane structure. They are compensated electrically by counter ions of the opposite charge. The characteristic electrical effects are due to the fact that the fixed ionized wall groups are unable to participate in the transportation of electricity across the membrane. Any current which flows is transported by the counter ions of the fixed-charge wall groups and whatever other electrolyte may be present in the pores. The concentration of this additional electrolyte in the pores depends upon the size of the pores, the charge density on the pore walls, and the concentration and nature of the electrolyte in the external solution.

In membrane terminology the term "critical" ions is used to denote the actual or potential counter ions of the fixed dissociable wall groups of a membrane. Ions identical in sign with the wall groups are denoted as "noncritical" ions. Thus in a cation membrane or an electronegative barrier type material, the noncritical ions would be anions and the critical ions would be cations.

An ideal membrane would be one in which the noncritical ions would be blocked from moving all the way across the membranes, and thus from taking part in the conductivity in the membrane phase. Fixed charges block this noncritical ion movement across the membrane, and thus it becomes apparent that if the number of fixed wall charges is high enough and the pores are small enough, the fixed charge within the pore will block off effectively any movement of noncritical ions across the membrane. The electrochemical properties of the membranes are therefore dependent, to a great extent, on the geometry of their pore systems and the distribution, number, and charge of the fixed-charge groups.

If a membrane is interposed between two solutions of different concentrations of the same electrolyte, an electromotive force arises which is different in most instances from the liquid junction potential originating between the solutions in the absence of the membrane. The electromotive force which arises in such membrane concentration cells is customarily referred to as the concentration potential. The sign and magnitude of this potential depends upon the nature of electrolyte, the concentration ratio of the two sloutions, their absolute concentrations, and on the nature of the membrane.

If the membrane has poor permselectivity, the potential between the two solutions drops toward the liquid junction potential; i.e., the membrane for all practical electrical purposes does not separate the two solutions. When the permselectivity of the membrane, on the other hand, is such that the two solutions may be considered as being completely separated, then the potential approaches the thermodynamic maximum value; i.e., the value of the E.M.F. which would arise if the two solutions were completely separated by a nonpermeable phase. Thus, the thermodynamically possible maximum value of the concentration potential represents the upper limit of the possible membrane potential, and the liquid junction potential represents the lower limit.

The permselectivity of an electronegative membrane is a measure of its ability to pass cations to the exclusion of anions, high permselectivity being desired. The permselectivity is calculable from the transport number of the mobile ion, and the transport number can be correlated with the membrane concentration potential in a modified Nernst equation. By measuring the concentration potential, the transport number can be arrived at using the equation. The transport number is an index of the permselectivity and serves for evaluation of a membrane. If desired, further calculation of the permselectivity from the transport number may be carried out, but it is unnecessary to the evaluation.

In the case of a uni-univalent electrolyte and a cation permeable membrane $$E = (t_+ - t_-)\frac{RT}{F} \ln \frac{a_2}{a_1}$$

where:
$E$ = the measured concentration potential with slight error for electrode potential, liquid junction potential, and membrane potential; E is corrected except where noted, in the present evaluations
$t_+$ = cation transport number
$t_-$ = anion transport number
$a_2$ = activity of the electrolyte in the more concentrated solution (calculated from the electrolyte concentration and the activity coefficient)
$a_1$ = activity of the electrolyte in the less concentrated solution
$R$ = the gas constant
$T$ = the absolute temperature
$F$ = Faraday's constant (96,489 coulombs per gram equivalent)

Since $t_- = 1 - t_+$, the equations for the respective transport numbers are $$E = (2t_+ - 1)\frac{RT}{F} \ln \frac{a_2}{a_1}$$

$$E = (1 - 2t_-)\frac{RT}{F} \ln \frac{a_2}{a_1}$$

and since the theoretical ideal membrane potential may be calculated from a simplified Nernst equation for reversible electrode potentials:

$$E_0 = \frac{RT}{F} \ln \frac{a_2}{a_1}$$

then $$\frac{E}{E_0} = 2t_+ - 1 = 1 - 2t_-$$

Solving for the transport numbers $$t_+ = \frac{E + E_0}{2E_0} \text{ and } t_- = \frac{E_0 - E}{2E_0}$$

In this manner, the transport numbers reported hereinafter were calculated from the measured concentration potentials.

Another property of permselective membranes, which is a direct criterion of their usefulness, is their ohmic resistance when at equilibrium with various electrolyte solutions. The resistance, or more specifically the conductance calculated therefrom, permits an accurate quantitative measure of the relative ionic permeability. A very low resistance is highly desirable in an ion exchange membrane.

In order to assure that an electronegative barrier has a high permselectivity and a low ohmic resistance, it is desirable that the membrane material be as thin as possible, while still possessing the other properties mentioned. The prior art has suggested collodion as a suitable material for making membranes or electronegative barriers. While this material has enabled membrane phenomena to be investigated, the material is unsatisfactory due to its poor resistance to strong acids and alkalies. Also, these and other prior ionic membrances have been produced by providing the ionic functional groups thereon after formation of the membrane body, by treating the membrane by oxidation or by adsorption of ionic materials thereon. Recently, finely ground ion exchange resins have been impregnated on chemically inert matrices and have shown promise in the field of the membranes. These materials, however, while having the satisfactory electrochemical properties, are nevertheless undesirably thick.

It is therefore an object of the invention to provide a new and improved electronegative selective permeable membrane or cation exchange membrane and method of producing the same which overcome the disadvantages of prior membranes.

An important object of the present invention is to provide a cation exchange membrane having high permselectivity.

Another object is to provide a membrane of the type described having an extremely low ohmic resistance.

An additional object is to provide a very effective method of producing a cationic membrane which exhibits the high permselectivity and low resistance required for practical industrial applications.

It is another object to furnish a cation exchange membrane which may be readily prepared.

Still another object is to provide a cation exchange membrane in the form of a thin homogeneous finely porous film, i.e., having minute pores through which cations may pass.

A further object is to furnish a cation exchange membrane which is chemically stable and is inert to acids and alkalies over prolonged periods of contact therewith.

Yet another object is to produce a cation exchange membrane being substantially thin and yet possessing great film strength.

These and other objects and advantages of the invention will appear throughout the specification.

In certain of its broader aspects, the invention comprises an electronegative selective permeable membrane of a cast intimate mixture of a water-insoluble, acid and alkali-resistant thermoplastic film-forming polymer and a substantially linear electronegative polyelectrolyte, in the form of a finely porous film. The cast film is preferably polar liquid-aftertreated, i.e., treated with a polar liquid after formation of the film. The polyelectrolyte preferably has a minimum average molecular weight of about 5000.

In an especially advantageous form, the electronegative or cationic membrane is an intimate mixture of a water-insoluble substantially linear polyvinyl-type thermoplastic film-forming resin and a water-soluble substantially linear polyvinyl-type electronegative polyelectrolyte, in the form of a thin finely perforate film. Preferably, the film is a cast intimate mixture of the polymeric ingredients, i.e., is formed by casting such a mixture. The polyvinyl-type polymers are those derived by the addition polymerization of at least one mono-olefinic compound through the unsaturated aliphatic group, and they include the polyvinyl compounds such as polyvinyl chloride, polyacrylic acid and polystyrene, and their substituted derivatives such as polyvinylidene chloride.

The new method of producing the membrane involves providing an organic solvent solution of preferably a major proportion of the film-forming polymer and a minor proportion of the polyelectrolyte, and casting a film of the polymers therefrom. The solution is provided in a thin layer, and solvent is removed by evaporation, to produce the membrane in the form of a finely porous film. The membrane is thus a homogeneous molecular dispersion of the materials, which is distinct, for example, from the type of mixture obtained when a solid substance is dispersed in another material. Preferably, the film in dry or solid form is contacted with a polar liquid.

A further method in accordance with the invention involves supplying a solution of an electrolyte to an electrolytic cell having the new membrane interposed between the anode and the cathode, and passing an electric current through the cell to displace the cations of the electrolyte from the anode compartment to the cathode compartment. In another useful method, cations are interchanged by diffusion across the membrane. The methods can be carried out in a continuous manner.

The electronegative ion exchange membranes or ionic selective permeable membranes consist of a thin thermoplastic film which is chemically stable, resistant to acids and alkalies and is water insoluble, having incorporated therein a linear electronegative polyelectrolyte having an average molecular weight of at least about 5,000. This polymer contains a plurality of functional groups capable of dissociation in aqueous media into anions which are attached to said polymer and cations capable of migration in the aqueous media.

The composite films are at least 0.0003 inch in thickness and preferably from .001 to .002 inch thick, but they may be thicker. Their electrical resistance, as measured in 0.10 N sodium chloride solution, is not greater than about 1,000 ohms per cm.$^2$ and is preferably not greater than about 300 and, most desirably, 30 ohms per cm.$^2$. In composition, these electronegative barriers preferably consist of a plastic film-forming material and at least 10% by weight, preferably up to 30%, and sometimes as high as 60% by weight of the polyelectrolyte. Especially valuable films are produced with between 15–20% by weight of polyelectrolyte contained therein.

The plastic film-forming materials used in the present invention may be of several types both from a standpoint of chemical structures and from their physical properties. In order to be operative, the plastic film-forming material must be capable of being cast into a thin homogeneous film from an organic solvent casting solution. This film must be chemically stable, highly resistant to acids and alkalies, and water insoluble, in order to provide ultimately a satisfactory composite membrane film. The film-forming material must also be compatible when dissolved or dispersed in a casting solution with the polyelectrolyte which is incorporated therewith at the time the membrane is cast.

The most useful type of film-forming plastic materials are those derived from the copolymerization of vinyl chloride and acrylonitrile. These polymers may range from between 45% and 80% by weight of vinyl chloride, preferably, between 60% and 80% vinyl chloride, the balance being acrylonitrile. Their specific viscosities at 20° C. are preferably from 0.2 to 0.6 (0.1 gram in 50 cc. acetonly acetone). Such polymers are described in U.S. Patent 2,420,565. A typical polymer of this type is a commercial material sold under the trade name Dynel. This material contains a major portion of vinyl chloride and a minor portion of acrylonitrile and varies somewhat in its constituents from batch to batch as manufactured. The material as supplied in its filament or fiber form has a specific gravity of 1.31 at 81° F., a tenacity wet or dry of 2.5–3.5 grams per denier and a 42% to 40% elongation wet or dry. The material is soluble in acetone, cyclohexanone and dimethylformamide. It has a strain release beginning at 240° F. and a softening range between 300° to 325° F.

Polymers containing vinylidene chloride and vinyl chloride in a percent by weight of about 90% to 10% and copolymers of vinylidene chloride and acrylonitrile also have properties useful for adaptation to the present invention. Another type of polymer useful is the copolymers produced by the copolymerization of polyvinyl alcohol and butyraldehyde. This latter copolymerization produces polyacetals whose film-forming properties, when reacted under the proper conditions, are similar to those indicated for the vinyl chloride-acrylonitrile polymers. The above polymers are all copolymers but homopolymers produced by the polymerization of vinyl chloride and vinylidene chloride are also suitable for practice and use in the present invention.

The above listed polymers are only indicative of the general class of polymers that may be employed. The type of polymer that is useful in the present invention is necessarily limited to its water insolubility, chemical stability, and acid and alkali resistance. It is also limited by its solubility characteristics in organic solvents and its compatibility with the polyelectrolyte with which it is incorporated, as will be hereinafter described. It is noted here, however, that the solvents that are generally used for casting these membranes are in part polar and will tend to precipitate many of the commercially available film-forming plastic materials.

The preferred plastic film-forming polymers are substantially linear and are practically free of cross linking. Infusible, insoluble substances which are for the most part brittle and tend to crack upon drying are not suitable for use in this invention. In a similar manner, polymers such as cellulose, cellulose acetate, and cellulose nitrate do not have the necessary physical characteristics when formed into films that are necessary for use in this invention.

The preferred plastic film materials have a high degree of plastic flow and are generally clear to opaque in physical appearance. While they are water insoluble, they have the ability to take up a very small part of water or polar organic solvent which, as will be seen subsequently, is important in the process used in producing these membranes.

The preferred polyelectrolytes which impart ionic, and thus also electrophilic, properties to the thin plastic film are substantially free from cross linking. The minimum average molecular weight for these polymers is about 5,000. They are generally water soluble, although this property is not necessary for the purpose of this invention. These polymers, like the film-forming materials, are preferably derived from the homo- or copolymerization of monomers having one olefinic linkage, and they are also characterized as containing a plurality of functional groups which dissociate into anions, attached to the linear chain, and into cations which are free to migrate when in aqueous solutions.

A preferred feature of the invention is the provision of the same type of basic polymer structure in both the film-forming material and the polyelectrolyte, that resulting from the polymerization of vinyl-type monomers. The respective polymers are thus characterized by a high degree of compatability which results in the formation of a uniform homogeneous membrane.

The functional groups of the polyelectrolyte may be of several types. For example, the functional or side chain groups of these polymers may be carboxylic, phosphonous, phosphonic and sulfonic. The preferred type polymer is that derived by the sulfonation of linear polystyrene. These materials preferably contain about one monosulfonic group per aromatic nucleus.

The polyelectrolytes that give most satisfactory results when employed in this invention are primarily homopolymers derived from the polymerization of one olefinic compound. For example, as previously pointed out, polystyrene sulfonic acid which is derived from the polymerization of styrene gives superior results. In a similar fashion polyacrylic acid gives good results, although the ionization of the carboxylic acid groups is not as strong as the ionization of the sulfonic acid groups.

Numerous anionic polymers capable of use in the present invention are described in a U.S. Patent 2,625,529, which describes synthetic water-soluble polyelectrolytes having a structure derived by the polymerization of at least one monoolefinic compound through the aliphatic unsaturated group, the structure being substantially free of cross-linking.

Other types of anionic linear polymers that may be employed are those possessing properties of metal chelation. They are generally derived from the condensation of two monomers to produce a structurally amphoteric copolymer. When using membranes made of these polymers it is generally desirable to operate in a pH range that gives the best result with the particular chelate polymer employed. Examples of such polymers would be those described in U.S. Patent 2,564,092.

The chelate polymers may have one or more of the following chelate donor groups incorporated in their structure, either as a side chain group or as a part of the chain.

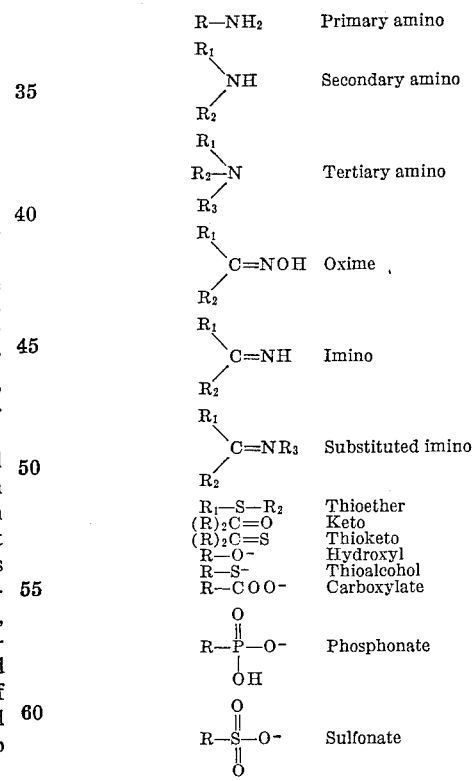

The polymers forming chelate compounds are likewise linear and substantially free of crosslinking.

The membranes of the present invention are generally produced by dissolving the plastic film-forming material and the polyelectrolyte in a suitable solvent or solvent system composed of organic liquids. The solvent is then allowed to evaporate with the film being formed by any suitable mechanical means. After the continuous film has been formed and dried, it is then treated with a polar liquid so that a pore structure having a plurality of fixed negative charges is formed.

The plastic film-forming material and the polyelectrolyte generally will be of a nature such that it is necessary or preferable to employ a cosolvent system to uniformly dissolve both of the ingredients. However, in some instances, it has been found that a single solvent is all that is necessary to form suitable cation membranes. The solvent system must be such that films having a thickness of at least .0003 inch are producible therefrom. The solvent system should dissolve preferably at least 1.6% by weight of the plastic film-forming material and preferably at least .1% of the polyelectrolyte.

Solvents for the preferred vinyl chloride-acrylonitrile film-forming polymers that have given satisfactory results in the invention are acetone, nitromethane, nitroethane, dimethylformamide, cyclopentanone and cyclohexanone. In addition to these solvents, dimethylacetamide, N,N-dimethylacetamide and N,N,N',N'-tetramethoxyamide may be used. Suitable solvents for the polyelectrolyte may be drawn from a wide variety of materials, the best results being obtained by using a low molecular weight aliphatic alcohol having not more than six carbon atoms. A cosolvent system is provided by combining a solvent for the film-forming material with one for the polyelectrolyte.

In the cosolvent systems, excellent results have been obtained by using various ratios of cyclohexanone and isopropyl alcohol or methyl alcohol. Thus, for example, membranes were produced very successfully where this system was employed with the plastic film-forming material Dynel, formed by the polymerization of vinyl chloride and acrylonitrile, and polystyrene sulfonic acid.

In some cases, such as with dimethylformamide, it is not necessary to use an additional solvent for the polyelectrolyte. However, the two-solvent system is preferred due to the fact that the films thus formed generally have greater mechanical strength than those produced from a single solvent system.

In choosing solvents for the dissolution of the plastic film-forming material and the polyelectrolyte, it is preferred that the boiling points of the solvents be less than the point at which the plastic film-forming material tends to exhibit properties of thermoplasticity.

In forming the solutions of the plastic film-forming material and the polyelectrolyte, care is taken in proportioning the solvents, as they will generally be mutually exclusive in their polar and nonpolar characteristics. In the case of polystyrene sulfonic acid, the highly polar nature of the material tends to make it extremely soluble in such polar solvents as water and methyl alcohol. Upon the addition of nonpolar solvents, the polystyrene sulfonic acid is sometimes coagulated from the solution, thus making it difficult to cast a film containing this material. The correct proportions are determined by simple experimentation.

Thus, for example, a mixture of cyclohexanone or cyclopentanone and methanol in a weight ratio of about 2–8.5:1, or a mixture of cyclohexanone or cyclopentanone and isopropanol in a ratio of about 2–11.5:1, provides a good cosolvent system for the preferred vinyl chloride-acylonitrile film-forming copolymers and polystyrene sulfonic acids. Employing a polymer mixture of about 70–90% by weight of film former and 30–10% of polyelectrolyte, and dissolving about 2–8%, by weight of the solution, of the polymer mixture in the cosolvent system, very useful membranes are cast from the solutions.

As a general rule, the more viscous the solution at a given concentration for a given solvent or a solvent system the more desirable the membrane that is cast therefrom. Increased viscosity provides increased mechanical strength in the films.

It is desirable to control the thickness of the films as much as possible. The films, as has been previously indicated, should be at least .0003 inch and preferably from .001 to .002 inch. Satsifactory membranes having thicknesses in excess of 0.005 inch have been produced using the techniques of the invention. In the case of cast Dynel-polystyrene sulphonic acid membranes, the best results have been obtained by using solutions having dissolved therein from 2% to 8% of the Dynel-polystyrene sulphonic acid mixture. Excellent results have been obtained by using a 4% solution of 80% Dynel and 20% polystyrene sulphonic acid in a cyclohexanone-isopropanol or cyclohexanone-methanol solvent system. Table I shows various exemplary solvents, temperatures, drying and pore production times used in preparing membranes, the compositions of which are shown in Table III.

TABLE I

*Solvent systems, evaporation time and treatment of evaporated membranes shown in Table III with polar solvents*

| Membrane number | Casting solvent systems, percent by weight [1] | | | DMF [2] | Drying time in hours at 94° F. | Treatment with polar solvents | |
|---|---|---|---|---|---|---|---|
| | Cyclopentanone | MeOH | Cyclohexanone | | | Solvent | Time in hours |
| I | | | | 96.63 | 17 | H₂O | 1 |
| II | 70.3 | 25.03 | | | 1 | H₂O | 1 |
| III | 70.3 | 25.03 | | | 0.75 | H₂O | 1 |
| IV | 70.3 | 25.03 | | | 1 | H₂O | 1 |
| V | | | 98.0 | | 17 | H₂O | 2 |
| VI | 73.0 | 25.0 | | | 17 | H₂O | 1 |
| VII | 64.6 | 32.4 | | | 17 | H₂O | 1 |
| VIII | 73.0 | 25.0 | | | 1 | MeOH | 1 |
| IX | 72.0 | 24.0 | | | 17 | H₂O | 1 |
| X | | 30.0 | 67.4 | | 17 | H₂O | 1 |
| XI | | 30.0 | 67.4 | | 17 | H₂O | 1 |
| XII | | 30.0 | 67.4 | | ³17 | H₂O | 1 |
| XIII | | 30.0 | 67.0 | | 17 | H₂O | 1 |
| XIV | | 30.0 | 67.0 | | 17 | H₂O | 1 |
| XV | | 30.0 | 67.0 | | 65 | H₂O | 1 |
| XVI | 71.9 | 26.10 | | | 1 | H₂O | 2 |
| XVII | | 30.0 | 66.0 | | 17 | H₂O | 24 |
| XVIII | | 30.0 | 67.0 | | 17 | H₂O | 24 |

[1] with balance of membrane constituents of Table III.
[2] dimethylformamide.
[3] dried at room temperature.

After the plastic film-forming material and the anionic polyelectrolyte have been suitably dissolved in a given solvent or solvent system, they are then formed by any suitable mechanical means into thin films. The basic principle of forming the electronegative membranes of the present invention is based upon the evaporation of the solvent, leaving a film cast upon a suitable surface or mold. The solutions may be passed through a long slot onto a rotating drum, whereby a film forms on the drum and is dried. The film is subsequently peeled off. The material may be poured on a continuous moving belt that has provision for controlled heat which will allow the film to dry. While any of the known commercial methods for forming these films may be employed, the membranes illustrated herein were cast in the following manner:

Three ml. of the casting solution was allowed to spread on a 4-inch by 4-inch by ¼-inch glass plate, and the resulting thin liquid film or layer was dried on a commercial hot plate. The temperature of the glass plate was approximately 95° F. The resulting membrane was removed from the glass plate by soaking in distilled water.

In using the same technique, larger membranes were cast on a larger glass plate measuring 12 inches by 15 inches by ¼ inch which was suspended above a commercial hot plate equipped with an adjustable thermostatic control. When the temperature of the glass plate attained equilibrium, approximately 95 ml. of a casting solution was allowed to spread over the entire surface. The resulting membrane was removed from the glass plate by immersion in deionized water.

In addition to casting membranes by drying them on a glass plate, several were also prepared by drying on a rotating drum. This latter procedure was substantially as follows:

The membranes were cast on a highly polished chromium-plated drum. This drum was rotated on its axis in a horizontal position with an adjustable speed motor and gear assembly. A 250-watt infra red bulb was placed above the drum so that the temperature of the drum could be maintained at the desired value. When the temperature of the drum attained equilibrium, a pan of casting solution was placed under the drum so it extended into the solution approximately ½ inch. The drum was rotated in this casting solution for a period of time, and the pan was removed. Rotation was continued until the membrane dried, and the latter was removed by rotating in a pan of deionized water. Multi-layer films were cast on the rotating cylinder by allowing the previously cast film to set before applying another coating.

In addition to casting the films by the techniques shown, several other methods may also be used with equal effectiveness. The films may be formed by building up several thin films by known multiple casting techniques whereby films of varying thicknesses may be prepared.

A feature of the present invention is that the casting solutions may be sprayed upon porous surfaces which act as bases, supports or frameworks to strengthen the films and make them more adaptable for use in electromechanical apparatus. In this particular adaptation, extremely thin films may be placed on rigid porous backing members either by spraying or casting technique using dilute solutions. The porous backing members may be of any suitable material, usually non-conductive. Plastic screens, porous ceramic materials, insulated metal screens and the like are suitable. When extremely dilute solutions are used, the films will by natural adhesive forces remain emplaced on the porous backing.

The evaporation of the solvent from the casting solution may be accomplished at room temperature or the temperature may be slightly above room temperature, but in no event should the heat applied exceed the decomposition point of the ingredients of the membrane. In the case of the Dynel and polystyrene sulphonic acid membranes, temperatures ranging from about 70° F. to 145° F. have produced electronegative barriers having satisfactory properties.

After drying the films for a period of time, they are placed in a polar solvent whereby the desired pore structure is obtained. This may be accomplished by either of two methods or by a combination of the two.

The first method is accomplished by partial leaching with a polar solvent to replace part of the casting solvent. Leaching is broadly defined as the process of washing or extracting soluble constituents from an insoluble material. In the process of this invention a phenomenon similar to the coagulation of suspended solids is apparently also exhibited, centralizing the polyelectrolyte. The leaching process has application in the production of thin membranes that are about .002 inch and greater in thickness. In carrying out this process, the membrane is first dried until all visible traces of solvent are removed, and the film has taken on a rigid form. The drying time is relatively short. In the case of Dynel-polystyrene sulphonic acid films from cyclohexanone-methanol, a period of about an hour at 100° F. is satisfactory. The membrane is then treated with a polar solvent such as water or a lower aliphatic alcohol for a period of time, and it is ready for use.

Due to the short drying time, there remains in the pore structure of the plastic film a relatively large amount of the nonpolar solvent. When the membrane is bathed in the polar solvent, large amounts of the nonpolar solvent tend to be displaced. The conditions are controlled to regulate the partial displacement of nonpolar solvent, to avoid the tendency of the structure of the plastic material to become loosened to the point of degradation. When this happens, the membrane loses its physical strength. Good results have been obtained with thicker films by applying the polar solvent to the film with a small atomizer.

In leaching the thicker membranes, it is preferred to use a stock formula in preparing the membranes and to test various leaching solvents as well as drying times, and the amount of solvent and duration of treatment to determine the optimum techniques to be used.

The second method of preparing membranes so that they will contain a plurality of pores having functional electronegative groups contained therein, which is especially useful in treating the thinner membranes, is to prepare membranes having a thickness of approximately 0.0003–.002 inch and to allow them to dry at approximately 15 to 50 hours at a temperature of 70° to about 145° F., preferably 90–115° F.

In preparing films of this thickness, the thickness of the film may readily be controlled by the amount of plastic film-forming material and polyelectrolyte contained in the solvent or solvent system used to prepare the casting media. For example, in the case of Dynel and polystyrene sulfonic acid, casting solutions containing about 4% solute which consists of the plastic film-forming material and polystyrene sulfonic acid in the ratio of about four to one have given very good results. By forming the film on a glass plate as described, films generally having a thickness of about .001 inch may be produced and have extremely good electrochemical properties.

When the films are dried for periods of time of about 15–20 hours at about 140° F., the amount of solvent contained in the plastic film-forming material tends to be driven from the pores, and a mechanical tightening or contraction of the film surface tends to take place. At about the end of the 15–20 hour period, the pore areas become relatively fixed and more contracted than in the case of the one-hour drying. Other conditions of time and temperature give the same results. At this time, the films are treated with a polar solvent such as water, methyl alcohol, or isopropanol. This latter mode of operation, in preparing the membranes of this invention, may be conveniently referred to as hydration.

By using the hydration technique and keeping the film within the thickness indicated, no special degree of caution need be exercised. The films may remain in the polar solvent for indefinite periods of time, and the hydration, which is fixed by the physical and chemical nature of the films, is uniform since only a given amount of polar solvent will migrate into the film matrix and form a uniform pore structure throughout.

If the membranes are dried too completely, the film tends to contract to a point where any pore structure that might have been formed is diminished to the point that a homogeneous nonpore structure is formed. When this phenomenon occurs, it is more difficult to treat the film so as to render it capable of being used as an electronegative barrier. It is then necessary to place the membrane in the polar solvent for a long period of time to render the pore structure suitable for use as an ionic electronegative barrier.

In the above discussion of the processes of leaching and hydration, it is to be understood that these discussions are theoretical in nature, and it is not intended to rely thereon for the operativeness of this invention. It is sufficient that the membranes may be produced in accordance with the technique and process of substantially removing the solvent from the film-forming material, drying the film to partially remove the solvent therefrom, and then treating it with a polar solvent so that a porous structure containing a plurality of negative charges is formed.

In the preparation of a casting solution, the selection of a solvent or solvent system may be simplified by rendering the polyelectrolyte less polar or less hydrophilic, and thus more soluble in organic solvents of low polarity, by preparing derivatives thereof.

In making and using the derivatives, two methods may be used. The polymer structure may be basically changed so that the linear hydrocarbon chain is rendered more hydrophobic. This may be accomplished by copolymerizing the olefinic polymers used in preparing the materials with olefinic compounds to produce a low degree of cross linking. They may be slightly cross linked with such known cross linking agents as divinyl benzene or any low molecular weight material containing at least two olefinic bonds. In performing this cross linking operation, only a minor amount of cross linking agent not to exceed two percent by weight of the finished polymer is used, and the hydrophilic properties of the produced polymer are only relatively slightly reduced. If larger amounts of the agent are used, the resulting products are infusible, insoluble and highly cross linked materials that resemble in nature ion exchange resins, which cannot be incorporated in the plastic film by solvent evaporation techniques.

The second method which is used to reduce the polarity or hydrophilic properties of the anionic linear polymers is to produce a salt or ester derivative of the functional groups attached to the linear structure. Good results have been achieved by reacting polystyrene sulfonic acid with dimethyl sulfate to produce the methyl ester.

Another method is to produce the organic salts of these materials with such compounds as tetrabutyl ammonium hydroxide, aniline, dimethyl aniline and tetramethyl ammonium hydroxide.

After the membranes have been formed, the salts or esters must be hydrolyzed before the membranes achieve maximum operativeness. This can be readily accomplished by placing the membranes in dilute solutions of acids or alkali whereby the hydrolysis regenerates the functional acid groups. This hydrolysis operation can be conducted as a part of the leaching or hydration.

In conducting the hydrolysis operation, it is preferred to dry the membranes down to a minimal point, where there is, however, a small amount of nonpolar solvent left within the film, and to then treat it with a dilute solution of acid or base to produce the free ionic functional groups contained in the membrane pore structure. If the membranes are completely dried down while containing the methyl ester or salt, the treatment with acid or alkali tends to hydrolyze relatively few of the functional groups, and hence the electrochemical properties of the membranes are substantially reduced.

In exemplary embodiments of the invention, numerous membranes were prepared using a Dynel film, described above, employing various molecular weight polystyrene sulfonic acids, which are listed in Table II.

TABLE II

| Polystyrene sulfonic acid: | Molecular weight |
|---|---|
| No. I | 25,000 to 40,000 |
| No. II | 21,000 to 35,000 |
| No. III | 21,000 to 35,000 |
| No. IV | 10,000 |
| No. V | 70,000 |
| No. VI | 15,000 to 30,000 |

The compositions of these membranes as well as their electrochemical properties are shown in Table III.

TABLE III

| Membrane number | Dynel, percent by weight | Polystyrene sulfonic acid | | Resistance in 0.10 N NaCl, ohms/cm.[2] | Permselectivity of membrane between 0.10/0.20 N NaCl at 25° C. | | | | Thickness in mils [2] |
|---|---|---|---|---|---|---|---|---|---|
| | | Number | Percent by weight | | Concentration potential (E), mv. | | Transport number (t) in membrane [1] | | |
| | | | | | Theoretical | Actual | Cation (t+) | Anion (t−) | |
| I | 81.0 | I | 19.0 | 41 | 32.6 | 12.5 | 0.692 | 0.308 | 0.7 |
| II | 84.1 | II | 15.9 | 26 | 16.3 | 14.6 | 0.949 | 0.051 | 2.7 |
| III [3] | 84.1 | II | 15.9 | 2,800 | 16.3 | 15.2 | 0.967 | 0.033 | 1.1 |
| IV | 84.1 | II | 15.9 | 903 | 16.3 | 15.2 | 0.967 | 0.033 | 2.4 |
| V [4] | 85.0 | VI | 15.0 | 360 | 16.3 | 15.9 | 0.988 | 0.012 | 0.5 |
| VI | 88.0 | IV | 12.0 | 18 | 16.3 | 16.2 | 0.997 | 0.003 | 0.6 |
| VII | 85.0 | V | 15.0 | 13 | 16.3 | [5] T | 1.000 | 0.000 | 1.0 |
| VIII | 90.0 | IV | 10.0 | 100 | 16.3 | 15.4 | 0.972 | 0.028 | 0.4 |
| IX | 85.0 | III | 15.0 | 120 | 16.3 | 15.2 | 0.967 | 0.033 | 1.1 |
| X | 80.0 | IV | 20.0 | 18 | 16.3 | 16.1 | 0.994 | 0.006 | 1.1 |
| XI | 80.0 | IV | 20.0 | 6 | 16.3 | 16.2 | 0.997 | 0.003 | 1.0 |
| XII | 80.0 | IV | 20.0 | 13 | 16.3 | [5] T | 1.000 | 0.000 | 0.7 |
| XIII | 80.0 | V | 20.0 | 13 | 16.3 | [5] T | 1.000 | 0.000 | 1.2 |
| XIV | 80.0 | V | 20.0 | 13 | 16.3 | 16.1 | 0.994 | 0.006 | 1.1 |
| XV | 80.0 | IV | 20.0 | 18 | 16.3 | [5] T | 1.000 | 0.000 | 0.8 |
| XVI | 84.0 | | 16 | 96 | 16.3 | 16.0 | 0.990 | 0.010 | 0.7 |
| XVII [6] | 80.0 | IV | 20.0 | 6 | 16.3 | 14.0 | 0.930 | 0.070 | 0.5 |
| XVIII [6] | 80.0 | IV | 20.0 | 41 | 16.3 | [5] T | 1.000 | 0.000 | 0.7 |

[1] Calculated.
[2] Sodium form in de-ionized water.
[3] Poor properties due in insufficient drying of the thin film. See Table I.
[4] Hydrolyzed in 0.1 N NaOH for 17 hours.
[5] Approximately theoretical potential.
[6] Drum cast.

The conductivity and potential measurements of the membranes were accomplished by using the apparatus shown in FIGURES 1 and 2.

FIGURE 1 is a front elevational view of the cell showing the relative position of the chambers for the liquids and electrodes.

FIGURE 2 is a side elevational and sectional view taken on line 2—2 of FIGURE 1 showing the two sections of the cell and the various compartments thereof whereby the conductivities of the membranes were measured.

The cell is composed of a clear solid methyl methacrylate plastic block 1 and a solution chamber 2 comprising two chambers 2a and 2b formed in the middle of the cell sections 1a and 1b. Platinized discs 3a and 3b form the outer ends of each chamber 2a and 2b. At the inner end of each chamber 2a and 2b is an annular projection 4a or 4b formed on the section 1a or 1b, which provides flanged surfaces for clamping the membrane 8 between the electrolyte chambers 2. Each section 1a or 1b contains three holes. A hole 5a or 5b is fitted with Ag-AgCl or calomel electrode (not shown). Perpendicular to the electrode cavity 5a or 5b is an opening 6a or 6b which allows escape of the effluent from the cell. The electrolyte solutions are admitted to openings 7a or 7b and flow into the chambers 2a or 2b.

The concentration potentials (E) required for the calculation of the degree of selectivity were determined in the following system:

| Ag, AgCl electrode | NaCl (0.1 N) | Membrane | NaCl (0.2 N) | AgCl, Ag electrode |
|---|---|---|---|---|

After the membrane had been equilibrated in a solution of 0.15 N NaCl for several hours, it was clamped in the cell and the foregoing solutions were flowed past the membrane surfaces at approximately 12.5 milliliters per minute for 20 minutes. The flow rate was then increased to 100 milliliters per minute and the potential was measured under flow conditions after 250 milliliters of liquid had passed through each cell. The potential was measured by means of a potentiometer electrically connected to the Ag-AgCl electrodes.

The ohmic resistance of the membrane was determined in the following system:

| Pt | NaCl (0.1 N) | Membrane | NaCl (0.1 N) | Pt |

After the membrane had been equilibrated in a 0.1 N NaCl for several hours, it was clamped in the cell, 0.1 N NaCl was added to each compartment, and the conductivity was determined with a conductivity recorder with three linear micromhos scales, 0–40, 400 and 4,000 (60-cycle instrument), electrically connected to the discs $3a$ and $3b$.

The polystyrene sulfonic acids shown in Table II were, in some instances, received from various commercial suppliers and in others were prepared by the direct sulfonation of polystyrene. Acid No. I was a commercial material received from the Dow Chemical Company. Acid No. II was prepared in the following manner:

Eleven grams of a commercial polystyrene, 50 ml. of concentrated $H_2SO_4$ and 0.23 gram of $Ag_2SO_4$ were placed in a three-necked flask equipped with a reflux condenser, a mercury sealed stirrer and a thermometer. The mixture was reacted at 85° to 90° C. for 35 hours, and then the brown viscous product formed was poured into 750 ml. of deionized water. After settling, the solution was passed through a 38 inch by 1¼ inch bed of a commercial anion exchange material known as Nalcite WBR, which is described in U.S. Patent 2,591,574, at approximately 40 ml. per minute. The resin had previously been regenerated with 2,000 ml. of 4% sodium hydroxide and backwashed with deionized water at 40 ml. per minute for 5 hours. Most of the excess $H_2SO_4$ was removed in the first pass and removal completed with a second cycle. The effluent was concentrated by vacuum distillation and the residue was dried in a vacuum desiccator over concentrated $H_2SO_4$.

The acid listed as No. III was prepared in the same manner as acid No. II except that initial reactants consisted of 20 grams of commercial polystyrene having an average molecular weight between 12,000 and 20,000, and 170 ml. of concentrated $H_2SO_4$ and 0.2 gram of $Ag_2SO_4$.

Polystyrene sulfonic acid No. IV was a commercial grade furnished in the ammonium form and was further processed by dissolving into 800 ml. of water and was passed through a 30 inch by 1¼ inch bed of a commercial cation exchanger known as Nalcite HCR of the type described in U.S. Patent 2,366,007. The cation exchanger, placed in the hydrogen form, removed the ammonium ion from the exchangeable sulfonic groups thus placing the polymer in its free acid form. The material was subsequently passed through a bed of Nalcite WBR anion exchange resin in a free base form. The effluent was evaporated to dryness on a steam bath. The residue was dissolved in methanol, filtered and again evaporated to dryness on a steam bath. The sample was finally dried in an oven at 100° C.

Acid No. V was prepared by a method similar to the treatment given to the commercial polystyrene ammonium sulfonate used to produce acid No. IV, except that the polystyrene ammonium sulfonate had a molecular weight of 70,000.

The polystyrene sulfonic acid No. VI was a material received from a commercial manufacturer and had an average molecular weight of between 15,000 and 30,000. The material as received was in its sodium form and for purposes of preparing the membrane was converted to its methyl ester. This was done by taking 20 grams of dimethyl sulfate and 5 grams of the sodium polystyrene sulfonate and refluxing the ingredients for 3 hours at 100° to 130° C. The cooled product was extracted with acetone and the inorganic salts present were subsequently precipitated by the addition of ethyl ether to the acetone. The ester was obtained by evaporating the acetone-ether mixture at room temperature. The results shown in Table III, wherein the methyl ester shown as acid No. VI is used, are based upon the hydrolyzed ester, the hydrolysis taking place after formation of the membrane, as explained above.

Membranes No. XI through No. XV were air dried at room temperature after being converted into the sodium form and equilibrated in 0.15 M NaCl, to determine whether this would affect their physical and electrodiffusional properties. Physically the membranes appeared to be unchanged, and the electrodiffusional properties are compared in Table IV.

TABLE IV

*Comparison of the electrodiffusional properties of membranes before and after drying in the sodium form*

| Membrane number | Resistance in 0.10 N NaCl (ohms/cm.²) | | Concentration potential,[1] mv., 0.10/0.20 N NaCl | |
|---|---|---|---|---|
| | Before | After | Before | After |
| XI | 18 | 18 | 16.1 | 16.5 |
| XII | 6 | 13 | 16.2 | 16.6 |
| XIII | 13 | 13 | 16.4 | 16.5 |
| XIV | 13 | 13 | 16.3 | 16.6 |
| XV | 13 | 13 | 16.1 | 16.5 |

[1] Uncorrected.

In a further exemplary embodiment of the invention, a six-cell deionizing unit was constructed. The six cation membranes used corresponded to membrane No. XIV in Table III.

The six anion membranes were about .0009 inch thick, had a resistance in 0.10 N NaCl of approximately 5 ohms per cm.² and a permselectivity of about 96% of the theoretical as measured in a 0.10 N|0.20 N NaCl system. The anion membranes were prepared by casting a 3% solution of 80% Dynel and 20% poly (vinyl benzyl trimethyl ammonium chloride) in 77% of cyclohexanone and 20% of methanol, and drying the film at 95° F. for 18 hours, to produce a film 0.9 mil thick when measured in the chloride form in deionized water. These membranes are disclosed in our copending application Serial No. 513,944, filed June 8, 1955. All the deionizing runs were conducted at 70°±5° F.

A schematic flow diagram of the six-cell multi-compartment unit is shown in FIGURE 3. When direct current is passed through the cell, electrolysis takes place at the electrodes, and the ions entering each deionizing compartment migrate to an adjacent salt waste compartment. Anions move to the right towards the anode through an anion membrane; cations move to the left towards the cathode through a cation membrane. Further movement of the ions out of the salt compartment is blocked by a membrane of similar charge.

The unit was constructed of Lucite. The cathode and anode were flat plates of stainless steel and graphite, respectively. Direct current was supplied with a voltage regulator and a full wave selenium rectifier. Current and voltage were measured by accurate laboratory-type instruments. The specific conductance of the effluent deionized water was recorded continuously.

The area of each deionizing compartment was 0.25 sq. ft., and the total area was 6 times this or 1.5 sq. ft. The unit thus contained 1.5 sq. ft. of cation membrane and 1.5 sq. ft. of anion membrane exposed to flowing water.

The raw water to be deionized was 0.01 N NaCl (29.2 g.p.g. as $CaCO_3$). This water was the only solution fed to the unit, going to both deionized water and waste-producing compartments. The total waste flow was set at 10% of the product deionized water flow, being divided 5% for the salt waste and 2½% for each electrode waste. Electrode waste flows were always downflow; the gases were allowed to bubble up through a column of water in tubing attached to compartment openings. The total holdup of water in the deionized water compartments was 200 ml. or one minute when the flow is 200 ml./min.

The deionizing cells were fed in parallel with raw water upflow from the common inlet channel according to FIGURE 3. The waste compartments were fed similarly with raw water, except in the downflow direction to make the operation countercurrent. The experimental results are given in Table V. The results indicated that the membranes may be employed advantageously in water deionization.

In additional embodiments, several membranes were cast on a glass plate with various aged casting solutions as well as variations in drying temperatures. The results are shown in Table VI. Aging the casting solution up to 8 days did not have appreciable effect. Prolonged drying at higher temperatures increased the resistance.

Table VII further illustrates the preparation and properties of membranes, varying several of the conditions from those illustrated in Tables I and III.

The expression electronegative barrier or membrane is used herein synonymously throughout with the expression cation exchange membrane.

The new membranes are useful in deionizing natural waters and waters containing large amounts of electrolytes such as sea water or many normally occurring brackish waters. They are also useful in removing electrolytes from process liquors such as are encountered in sugar processing operations and the like.

TABLE V

*Deionization of 0.01 N NaCl with multi-compartment cell*

| Run No. | Flow | | Voltage, volts | Current, milli-amperes | Deionized water | | | Ion leakage, percent |
|---|---|---|---|---|---|---|---|---|
| | Ml./min. | G.p.m./ sq. ft. | | | Cond., micro-mhos | Acid-base, g.p.g. as $CaCO_3$ | Cl, g.p.g. as $CaCO_3$ | |
| 1 | 48.8 | 0.0086 | 30 | 160 | 110 | Neutr. | 2.35 | 8.1 |
| 2 | 198 | 0.035 | 70 | 435 | 400 | 0.5 NaOH | 9.4 | 33.3 |

TABLE VI

*Variation of cation-permeable-membrane properties with age of casting solution and drying temperature*

Composition of membrane and casting solution:

0.6%—polystyrene sulfonic acid No. IV, Table II
2.4%—Dynel
21.0%—methanol
76.0%—cyclohexanone

| Membrane No. | Age of casting solution, days | Drying conditions | | Thickness in mils | Resistance of membrane in 0.10 N NaCl ohms/$cm.^2$ | Permselectivity of membrane between 0.10/0.20 N NaCl at 25° C. | | | |
|---|---|---|---|---|---|---|---|---|---|
| | | Temp., °F. | Time, hrs. | | | Concentration potential, mv. | | Transport number in membrane | |
| | | | | | | Theoretical | Actual | Cation | Anion |
| XIX | 0 | 95 | 18 | 0.8 | 6 | 16.3 | [1] T | 1.000 | 0.000 |
| XX | 0 | [2] 95-145 | [2] 18-24 | 0.8 | 1,070 | 16.3 | [1] T | 1.000 | 0.000 |
| XXI | 1 | 95 | 18 | 0.8 | 22 | 16.3 | [1] T | 1.000 | 0.000 |
| XXII | 1 | 95-145 | 18-24 | 0.5 | 330 | 16.3 | [1] T | 1.000 | 0.000 |
| XXIII | 2 | 95 | 18 | 0.5 | 6 | 16.3 | [1] T | 1.000 | 0.000 |
| XXIV | 2 | 95-145 | 18-24 | 0.5 | 140 | 16.3 | [1] T | 1.000 | 0.000 |
| XXV | 3 | 95 | 18 | 0.7 | 6 | 16.3 | 16.2 | 0.997 | 0.003 |
| XXVI | 3 | 95-145 | 18-24 | 0.6 | 144 | 16.3 | [1] T | 1.000 | 0.000 |
| XXVII | 8 | 95 | 18 | 0.5 | 0 | 16.3 | 16.1 | 0.994 | 0.006 |
| XXVIII | 8 | 95-145 | 18-24 | 0.5 | 80 | 16.3 | 16.2 | 0.997 | 0.003 |

[1] Approximately theoretical potential.
[2] Dried at 95° F. for 18 hours and at 145° F. for 24 hours.

TABLE VII

| Membrane No. | Casting composition percent by weight | | | | Drying conditions | | Solvent treatment | | Film thickness, mils | Resistance in 0.15 N KCl, ohms/$cm.^2$ | Concentration potential mv., between 0.10 N/ 0.20 N KCl at 25° C. | |
|---|---|---|---|---|---|---|---|---|---|---|---|---|
| | CYH [1] | IsOH [2] | Dynel | PSA [3] | Temp., °F. | Time, hrs. | Solv. | Time, hrs. | | | Theor. | Actual |
| XXIX | 72 | 20 | 6.4 | 1.6 | 90 | 46 | $H_2O$ | 1 | 5.4 | 10 | 16.1 | 15.5 |
| XXX | 87.5 | 7.5 | 4.0 | 1.0 | 105 | 17 | $H_2O$ | 1 | 2.0 | 3.8 | 16.1 | 13.4 |
| XXXI | 80 | 15.0 | 4.0 | 1.0 | 105 | 17 | $H_2O$ | 1 | 2.2 | 2.0 | 16.1 | 15.1 |

[1] Cyclohexanone.
[2] Isopropanol.
[3] Polystyrene sulfonic acid No. IV, Table II.

Other applications include concentrating dilute salt solutions, e.g., radioactive waste waters; separating ionic mixtures, as in the production of salt-free caustic and chlorine by the electrolysis of sodium chloride, splitting of waste neutral salts such as sodium sulfate, preparation of organic acids from their salts and subsequent purification of the acid, preparation of amines from their hydrochloride salts and their subsequent purification, electrolytic processes where the cathode and anode products must be kept separated, i.e., battery separators, recovering sulfuric acid and iron from spent sulfuric acid pickle liquors, and recovery of chlorine or hydrochloric acid from spent hydrochloric acid pickle liquors; separation of electrolytes from non-electrolytes in aqueous systems, as in producing silica sols, removing ionic impurities from glycerine, artificial body organs, isolating specific enzymes, and separation of non-electrolytes from electrolytes by diffusion of the former through the membrane (continuous ion exclusion); removing electrolytes from non-electrolytes in non-aqueous systems, as in removing ionic impurities from gasoline, and removing ionic impurities from oil; physical and biological research investigations as in the determination of the dissociation constant of polyphosphates, and studying the structure of proteins; and ion interchange by diffusion across membranes as in softening by replacing calcium and magnesium with sodium under countercurrent flow conditions, and salt splitting by exchanging hydrogen ions across a cation membrane or hydroxyl ions across an anion membrane under countercurrent flow conditions.

The invention is hereby claimed as follows:

1. An electronegative selective permeable membrane of a cast homogeneous mixture of 40–90% by weight of a water-insoluble, acid and alkali-resistant thermoplastic film-forming polymer being an addition polymer of at least one mono-olefinic compound polymerized through the olefinic group and 60–10% by weight of a substantially linear water-soluble electronegative polyelectrolyte, said membrane being cast in the form of a finely porous film from a solution of said mixture, being equilibrated in a polar liquid, and having a maximum electrical resistance of 1000 ohms per square centimeter when at equilibrium in one-tenth normal sodium chloride solution.

2. An electronegative selective permeable membrane of a cast homogeneous mixture of 40–90% by weight of a water-insoluble, acid and alkali-resistant substantially linear polyvinyl thermoplastic film-forming polymer and 60–10% by weight of a water-soluble substantially linear polyvinyl electronegative polyelectrolyte, said membrane being cast in the form of a finely porous film from a solution of said mixture, being equilibrated in a polar liquid, and having a maximum electrical resistance of 1000 ohms per square centimeter when at equilibrium in one-tenth normal sodium chloride solution.

3. An electronegative selective permeable membrane of a cast homogeneous mixture of 40–90% by weight of a film-forming vinyl chloride-acrylonitrile copolymer and 60–10% by weight of water-soluble polystyrene sulfonic acid having a minimum average molecular weight of about 5000, said membrane being cast in the form of a finely porous film from a solution of said mixture, being equilibrated in a polar liquid, and having a maximum electrical resistance of 1000 ohms per square centimeter when at equilibrium in one-tenth normal sodium chloride solution.

4. An electronegative selective permeable membrane of a cast homogeneous mixture of 70–90% by weight of a film-forming vinyl chloride-acrylonitrile copolymer and of 30–10% by weight of water-soluble polystyrene sulfonic acid having a minimum average molecular weight of about 5000, said membrane being cast in the form of a finely porous film from a solution of said mixture, being equilibrated in a polar liquid, and having a maximum electrical resistance of 1000 ohms per square centimeter when at equilibrium in one-tenth normal sodium chloride solution.

5. The method of producing an electronegative selective permeable membrane which comprises providing an organic solvent solution of a homogeneous mixture of 40–90% by weight of water-insoluble, acid and alkali-resistant thermoplastic film-forming polymer being an addition polymer of at least one mono-olefinic compound polymerized through the olefinic group and 60–10% by weight of a substantially linear water-soluble electronegative polyelectrolyte, casting a film of the polymers therefrom, and contacting the film with a polar liquid until equilibrium is reached with said polar liquid to produce a porous film structure containing a plurality of fixed negative charges providing a selective permeable membrane having a maximum resistance of 1000 ohms per square centimeter when at equilibrium in one-tenth normal sodium chloride solution.

6. The method of producing an electronegative selective permeable membrane which comprises providing an organic solvent solution of a homogeneous mixture of 40–90% by weight of a water-insoluble, acid and alkali-resistant substantially linear polyvinyl thermoplastic film-forming polymer and 60–10% by weight of a water-soluble substantially linear polyvinyl electronegative polyelectrolyte, forming said solution in a thin layer, removing solvent from the layer by evaporation, and contacting the layer with a polar liquid until equilibrium is reached with said polar liquid to produce a porous film structure containing a plurality of fixed negative charges providing a selective permeable membrane having a maximum resistance of 1000 ohms per square centimeter when at equilibrium in one-tenth normal sodium chloride solution.

7. The method of producing an electronegative selective permeable membrane which comprises providing an organic solvent solution of a homogeneous mixture of 40–90% by weight of a film-forming vinyl chloride-acrylonitrile copolymer and 60–10% by weight of water-soluble polystyrene sulfonic acid having a minimum average molecular weight of about 5000, forming said solution in a thin layer, removing solvent from the layer by evaporation to provide a film in dry form, and contacting the film with a polar liquid until equilibrium is reached with said polar liquid to produce a porous film structure containing a plurality of fixed negative charges providing a selective permeable membrane having a maximum resistance of 1000 ohms per square centimeter when at equilibrium in one-tenth normal sodium chloride solution.

8. The method of producing an electronegative selective permeable membrane which comprises providing about a 2–8% solution in about 2 to 8.5–1 cyclohexanone-methanol of a mixture of about 70–90% of a film-forming vinyl chloride-acrylonitrile copolymer and the balance water-soluble polystyrene sulfonic acid having a minimum average molecular weight of about 5000, forming said solution in a thin layer, removing solvent from the layer by evaporation, and contacting the layer with a polar liquid until equilibrium is reached with said polar liquid to produce a porous film structure containing a plurality of fixed negative charges providing a selective permeable membrane having a maximum resistance of 1000 ohms per square centimeter when at equilibrium in one-tenth normal sodium chloride solution.

9. The method of producing an electronegative selective permeable membrane which comprises providing about a 2–8% solution in about 2 to 11.5–1 cyclohexanoneisopropanol of a mixture of about 70–90% of a film-forming vinyl chloride-acrylonitrile copolymer and the balance water-soluble polystyrene sulfonic acid having a minimum average molecular weight of about 5000, forming said solution in a thin layer, removing solvent from the layer by evaporation, and contacting the layer with a polar liquid until equilibrium is reached with said polar liquid to produce a porous film structure containing a plurality of fixed negative charges providing a selective permeable membrane having a maximum resistance of 1000 ohms per square centimeter when at equilibrium in one-tenth normal sodium chloride solution.

10. The method which comprises supplying a solution of an electrolyte to an electrolytic cell having an electronegative selective permeable membrane interposed between the anode and the cathode to form corresponding compartments, and passing an electric current through the cell to displace the cations of the electrolyte from the anode compartment to the cathode compartment, said membrane being a cast homogeneous mixture of 40–90% by weight of a water-insoluble, acid and alkali-resistant thermoplastic film-forming polymer being an addition polymer of at least one mono-olefinic compound polymerized through the olefinic group, and 60–10% by weight of a substantially linear water-soluble electronegative polyelectrolyte, said membrane being cast in the form of a finely porous film from a solution of said mixture and having a maximum electrical resistance of 1000 ohms per square centimeter when at equilibrium in one-tenth normal sodium chloride solution.

11. An electronegative selective permeable membrane of a cast homogeneous mixture of 40–90% by weight of a water-insoluble, acid and alkali-resistant substantially linear thermoplastic film-forming polymer being an addition polymer of at least one mono-olefinic compound polymerized through the olefinic group and 60–10% by weight of a water-soluble substantially linear electronegative polyelectrolyte being an addition polymer of at least one mono-olefinic compound polymerized through the olefinic group, said polymers containing not more than 2% by weight of a cross linking agent, said membrane being cast in the form of a finely porous film from a solution of said mixture, being equilibrated in a polar liquid, and having a maximum electrical resistance of 1000 ohms per square centimeter when at equilibrium in one-tenth normal sodium chloride solution.

12. The method of producing an electronegative selective permeable membrane which comprises providing an organic solvent solution of a homogeneous mixture of 40–90% by weight of a water-insoluble, acid and alkali-resistant substantially linear thermoplastic film-forming polymer being an addition polymer of at least one mono-olefinic compound polymerized through the olefinic group and 60–10% by weight of a water-soluble substantially linear electronegative polyelectrolyte being an addition polymer of at least one mono-olefinic compound polymerized through the olefinic groups, said polymers containing not more than 2% by weight of a cross linking agent, casting a film of the polymers therefrom, and contacting the film with a polar liquid to produce a porous film structure containing a plurality of fixed negative charges providing a selective permeable membrane having a maximum resistance of 1000 ohms per square centimeter when at equilibrium in one-tenth normal sodium chloride solution.

13. An electronegative selective permeable membrane comprising a homogeneous molecular dispersion of 70–90% by weight of a water-insoluble, acid and alkali-resistant thermoplastic film-forming polymer being an addition polymer of at least one mono-olefinic compound polymerized through the olefinic group, and 30–10% by weight of a water-soluble substantially linear electronegative polyelectrolyte, in the form of a finely porous film, said membrane being equilibrated in a polar liquid and having a maximum electrical resistance of 1000 ohms per square centimeter when at equilibrium in one-tenth normal sodium chloride solution.

14. An electronegative selective permeable membrane consisting of a homogeneous molecular dispersion of 40–90% by weight of a copolymer of about 45% to 80% by weight of vinyl chloride and the balance acrylonitrile, and 60–10% by weight of water-soluble polystyrene sulfonic acid having a minimum average molecular weight of about 5000, in the form of a finely porous film, said membrane being equilibrated in a polar liquid and having a maximum electrical resistance of 1000 ohms per square centimeter when at equilibrium in one-tenth normal sodium chloride solution.

15. The method for transferring cations from one liquid region to another while excluding anions which comprises interposing an electronegative selective permeable membrane between said regions being in contact with opposite sides of said membrane, said membrane being a homogeneous molecular dispersion of 40–90% by weight of a water-insoluble acid and 60–10% by weight of alkali-resistant thermoplastic film-forming polymer being an addition polymer of at least one mono-olefinic compound polymerized through the olefinic group, and a substantially linear water-soluble electronegative polyelectrolyte, in the form of a finely porous film, said membrane having a maximum electrical resistance of 1000 ohms per square centimeter when at equilibrium in one-tenth normal sodium chloride solution.

16. The method defined in claim 10 wherein said membrane consists of 40–90% by weight of a copolymer of about 45–80% by weight of vinyl chloride and the balance acrylonitrile, and 60–10% by weight of water-soluble polystyrene sulfonic acid having a minimum average molecular weight of about 5000.

References Cited in the file of this patent

UNITED STATES PATENTS

| | | |
|---|---|---|
| 2,510,262 | Sollner | June 6, 1950 |
| 2,688,008 | Chaney | Aug. 31, 1954 |
| 2,721,171 | Arnold | Oct. 18, 1955 |
| 2,730,768 | Clark | Jan. 17, 1956 |
| 2,731,408 | Clark | Jan. 17, 1956 |

OTHER REFERENCES

Meyer: "Natural and Synthetic High Polymers," vol. 4, 2nd Ed. (1950), pages 817 and 818.

UNITED STATES PATENT OFFICE
CERTIFICATION OF CORRECTION

Patent No. 3,004,904                              October 17, 1961

Harry P. Gregor et al.

It is hereby certified that error appears in the above numbered patent requiring correction and that the said Letters Patent should read as corrected below.

Column 1, line 71, for "sloutions" read -- solutions --; column 3, line 21, for "membrances" read -- membranes --; columns 11 and 12, TABLE III, footnote 3 thereof, for "in" read -- to --; column 17, line 32, after "of" insert -- a --; column 19, line 53, after "liquid" insert -- until equilibrium is reached with said polar liquid --; column 20, line 30, strike out "60-10% by weight of" and insert the same after "and" in line 33, same column; same column 20, line 35, after "membrane" insert -- being equilibrated in a polar liquid and --; lines 53 and 54, for "Clark", each occurrence, read -- Clarke --.

Signed and sealed this 5th day of June 1962.

(SEAL)
Attest:

ERNEST W. SWIDER                              DAVID L. LADD
Attesting Officer                                 Commissioner of Patents